US00RE39797E

(19) United States
(12) Reissued Patent
Munz

(10) Patent Number: US RE39,797 E
(45) Date of Reissued Patent: Aug. 28, 2007

(54) CLEANING DEVICE FOR PRESSURE CYLINDERS OF ROTARY PRINTING PRESSES

(76) Inventor: Richard Munz, Ekkebertstr. 28c, 79117 Freiburg (DE)

(21) Appl. No.: 11/127,019

(22) PCT Filed: Mar. 15, 2000

(86) PCT No.: PCT/EP00/02260

§ 371 (c)(1),
(2), (4) Date: Sep. 12, 2001

(87) PCT Pub. No.: WO00/54971

PCT Pub. Date: Sep. 21, 2000

Related U.S. Patent Documents

Reissue of:
(64) Patent No.: 6,561,096
Issued: May 13, 2003
Appl. No.: 09/936,450
Filed: Sep. 12, 2001

(30) Foreign Application Priority Data

Mar. 16, 1999 (DE) ..... 299 04 781 U

(51) Int. Cl.
*B41F 35/00* (2006.01)
*B41F 35/06* (2006.01)

(52) U.S. Cl. ..... 101/425; 101/423; 101/424; 15/256.51; 15/256.53

(58) Field of Classification Search ..... 101/423, 101/424, 425; 15/256.51–53
See application file for complete search history.

(56) References Cited

U.S. PATENT DOCUMENTS 2,393,992 A * 2/1946 Kauffeld ..... 101/425
5,010,819 A * 4/1991 Uribe et al. ..... 101/425
5,918,545 A * 7/1999 Pym ..... 101/424

FOREIGN PATENT DOCUMENTS

| | | | |
|---|---|---|---|
| DE | 4203914 A1 | * | 9/1992 |
| DE | 29722183 U1 | * | 4/1998 |
| EP | 369565 A2 | * | 5/1990 |
| WO | WO 98/41402 A1 | * | 9/1998 |

* cited by examiner

*Primary Examiner*—Andrew H. Hirshfeld
*Assistant Examiner*—Jill E. Culler
(74) *Attorney, Agent, or Firm*—Volpe and Koenig, P.C.

(57) ABSTRACT

A cleaning device (1) having a guide rail (3) with a longitudinally moveable carriage, to which carriage (4) a washing apparatus (5) is releasably affixed. The guide rail (3) is positionally adjustable for operationally placing the washing apparatus (5) at a printing cylinder (2). The washing apparatus (5) is connected to a supply unit by means of supply lines. The supply lines extend within the guide rail (3) from the washing apparatus (5) to a stationary connection position (7). The guide rail (3) includes a suction wastewater channel (14) which is placed between an upper section (15) and a lower section (16) of a movable belt (19) which is designed for the reciprocal transport of the carriage (4). A belt (19) section (15) forms a cover for the suction wastewater channel (14). The carriage (4) is provided with a connection fitting (25) penetrating into the suction wastewater channel, and at the stationary connection point (7) a connection pipe (26) is connected to the suction wastewater channel (14), while the remainder of the supply lines run beside the suction wastewater channel (14) within the guide rail (3) from the stationary supply position (7) to the carriage (4).

20 Claims, 5 Drawing Sheets

CLEANING DEVICE FOR PRESSURE CYLINDERS OF ROTARY PRINTING PRESSES

Matter enclosed in heavy brackets [ ] appears in the original patent but forms no part of this reissue specification; matter printed in italics indicates the additions made by reissue.

BACKGROUND

The invention concerns a cleaning device for the printing cylinder of a rotary printing press, with a guide rail placed somewhat parallel to the printing cylinder, on which a longitudinally movable carriage slides, and upon which a washing apparatus is releasably mounted, whereby the guide rail, in order to place the washing apparatus before the printing cylinder, is controllingly displaceable, and wherein the washing apparatus is connected to a supply center by means of supply lines for washing detergents, air, electrical current, and the like.

On a rotary printing press, due to normal operation and dependent upon the kin of color and the paper to be printed, buildups of colors and paper dust form. This buildup increases with the quantity of printing, and after a certain amount has accumulated, the printing quality is negatively affected.

In most cases, the usual printing cylinder, which may be made of rubber cloth, is manually cleaned during a machine stop, which practice, besides the expense, presents safety risks for the personnel, since the cylinder rotates with a motorized drive.

For some time, automated washing systems for the cleaning of the printing cylinder have been installed. These systems are based on a rotating brush or a cleaning cloth which periodically unwinds itself and by means of a nozzle spray system is wetted with a selected detergent and water. The cleaning process is carried out by means of placement of said cloth on the rotating printing cylinder. All these systems clean by the application of a detergent.

Such washing systems are specific to each printing cylinder and are installed, to wash the printing cylinder in an appropriate cycle, between a number of printings in one run and/or after the end of the printing run. By means of this washing, the color and paper dust deposits are cleaned away. The freshly cleaned rubber cloth of the rubber cloth cylinder now assures a continuation of printing of the current run with a good degree of quality, or provides the proper starting conditions after a change of print order.

The washing systems are mostly automatically activated, and installed on the printing cylinder and are initiated by a specified washing program from the control station of the rotation equipment or by means of a master controller.

A disadvantage of these wash systems which are found on the market, is the specific attachment to only one printing cylinder. Especially during mounting of the wash system, the integration of the equipment into the printing machine becomes a complex operation. In addition to this, design accommodations are necessary, matching each rotation machine type and rotation machine format, with consideration given to the cylinder circumference. The design then extends itself not only to the wash system but also to the rotary machine itself.

Further disadvantages lie in the width of the washing system. All systems must have the same axial width as the cylinder to be cleaned. Disadvantages are further conditioned by the rigid installation and dedication to a specific printing cylinder. Further, consideration must be given to the technical construction of the cylinder as well as to the limited ergonomical possibilities.

The required accessibility for the operator is, with the above assembly, limited. Thus, the rubber cloths, which are found on the rubber cloth cylinder and which, due to damage or wear during or after the print run, have to be changed, can only be changed when the particular washing system is dismantled and removed.

A further disadvantage is that systems, because of their stationary installation on the specific printing roll, are, as a rule, not generally exchangeable. Analogously then, the number wash systems to be installed will be the same as the number of printing rollers.

Yet a further disadvantage is the amount of service, cleaning, and maintenance which calls for a high expenditure of technical time.

EP 0 928 687 A1 discloses a rubber cloth cleaning device, which is smaller than the breadth of the printing cylinder to be cleaned. This cleaning device can be moved along a guide rail parallel to the longitudinal extent of the printing cylinder. Thereby, by the pushing of the cleaning device along the guide rail, the accessibility and vision at any optional point on the rubber cloth cylinder is made possible.

In the case of this cleaning device, the connection of the in and out flow lines from an external, central supply point is directly through a central supply hose to the washing apparatus. The central supply hose is, in this case, conducted by a carrier, whereby, a sufficient freedom of movement must be allowed to compensate for the movements of the wash apparatus. These hoses, in the case of generally tight space requirements of the printing machines, are not particularly desired, because of the loose line guidance due to the movement of the washing apparatus. This arrangement is also disadvantageous, because, among other things, of the danger of damage.

From safety considerations, it is often not allowable to supply electrical energy, hot water, and detergent by means of one loose central supply hose in the direct proximity of rotating printing cylinders. The supply hose could be a central consolidating carrying in turn the supply hoses for said media. Added to these, could be another hose for the return flow of the spent water-detergent mixture.

SUMMARY

The object of the present invention is to create a cleaning device of the kind described in the introductory passages, which, in total, is space saving and with which an extended loose connection is avoided, so that even an installation in safety relevant areas is possible.

For the achievement of this object, it is proposed, that: the supply lines be conducted through the inside of the guide rails from the washing apparatus to a stationary connection point, that the guide rail possess internally a suction wastewater channel, which is placed between upper and the lower sections of a belt running between turnaround rollers for the transport of the carriage, that a belt section from an extensively sealing covering for the open suction wastewater channel located on a longitudinal side, that in the area of the carriage, at least one access pipe fitting be conducted into the interior of the suction wastewater channel, and that proximal to the stationary connection point, a connecting pipe is provided which is connected to the access pipe fitting entering the suction wastewater channel, and that the remaining supply lines beside the suction wastewater channel run inside the guide rail from the stationary connection point to the carriage.

In this way, a loose, bulky outlay of a line is avoided. Especially, by this arrangement in accordance with the invention, the supply and removal lines are protectively conducted in the interior of the guide rail, so that damages from external influences are avoided and also a replacement is possible in safety relevant areas.

An advantageous embodiment provides, that the suction wastewater channel is made in essentially a U-shaped profile, as seen in a cross section end view, whose open side is covered over by a section of the belt. Advantageously the longitudinal edges of the belt on its surface distal from the suction wastewater channel are provided with longitudinally extended side rims. Because of the low pressure in the suction wastewater channel, the belt is sealingly pressed onto the edges of the U-shaped member and is guided laterally by means of the side rims.

It is particularly advantageous, if the belt, advantageously designed as a toothed belt, on the inside, respectively in the area proximal to the edges, prossesses in the circumferential direction penetrating grooves, and if the suction wastewater channel sealingly engages the edges of its open longitudinal sides in the penetrating grooves.

By this means, a good, tight seal is made between the belt and the U-shaped member. One embodiment provides, that the guide rail be made in the shape of a basin, and possess on the outside, advantageously, U-shaped guiding members. The carriage overlaps the U-shaped guiding members, preferably with bearing based sliding means.

By means of the outside located guides, the inner space thereof stands available to receive the suction wastewater channel and to contain the necessary supply lines. Beyond this, the guides for the carriage are found at the most extreme side to side distance as possible, whereby the positioning is stabilized and an exact guidance even at higher operational demands is available.

The guide rail possesses an open inside cross-section for the reception of the suction wastewater channel with the belts which run about them, as well as a receiving space for the supply lines which are especially held by a drag chain.

The drag chain is fastened at one end of the guide rail and runs, loopwise, to the carriage. The suction wastewater channel can be somewhat distanced by being placed at the bottom of the guide rail, so that, first, space for the one section of the belt which runs through under the suction wastewater channel, and second, a place is made for a part of the drag chain. The guide rail has, thus, the entire inside width of the guide rail available for the storage of the temporarily unused, portion of the drag chain. This allows for the coiling of larger supply lines.

In a purposeful manner, the stationary connection point, for the supply lines which are conducted to the carriage, is placed at one end of the guide rail, whereby for the movement of the supply lines within the guide rail, advantageously, a pull chain is provided. This arrangement brings the stationary supply connection outside of the danger zone of damage. On the outer ends of the guide rails, as a rule, there is to be found either a lateral carrying structure or a wall, on which the guide rail is supported by means of a holder. On this carrying structure or wall, as the case may be, it is also possible to install a connection between the supply source and the stationary connection point.

The stationary connection point, which also does not join in the lateral displacement movement of the carriage, possesses advantageously, a short piece of line, which protrudes out of the guide rail. On the end of this short piece of line, are provided connection fittings for direct connection, or connection by means of a feedline to the supply source unit.

Advantageously, a hose is connected onto the connecting pipe of the suction wastewater channel which opens at the connection point. Preferably, at the stationary connection point, quick opening, plug-in connections would be provided for connection to the supply source unit. Thereby a quick on and off coupling is possible, for instance for maintenance purposes.

The guide rail possesses sliding elements at its outer ends, for forward and back movements transverse to its longitudinal extent, to be inserted in appropriate holding means. For this movement, thrust cylinders, preferably compressed air cylinders, are provided. These cylinders are correspondingly located at the ends of the guide rail and are coupled to lateral holding means by their thrust elements.

Activated by remote control, the thrust cylinders move the guide rail assembly with the washing apparatus which is mounted thereon, over an adjustable thrust range forward to the washing position and back again into an idle position.

Advantageously, the carriage and the washing apparatus which is removably affixed thereon, possess on their mutually facing sides, electrical plug-in connections, liquid couplings, as well as wastewater connections, which are designed as self coupling, complementary elements. Moreover, for the positional precision of carriage and washing apparatus relative to said coupling and connections, at least one positioning pin with a complementary counter opening is provided therebetween.

By these means, all supply and removal lines are automatically coupled when the washing apparatus is set in place, and in reverse manner, said lines can be disconnected upon removal of the washing apparatus. Thus it is possible to effect an exchange of the washing apparatus in the least amount of time.

Besides such an exchange in the case of maintenance work, this ease of connection facility is especially of value, when one washing apparatus is employed successively for a plurality of printing cylinders, for which, in each case, a guide rail has been installed.

Another embodiment makes the proposal, that for the interconnection of the washing apparatus and the carriage, advantageously, tongues with complementary entry openings can be used, and distanced from this connection position, a lock jointure be provided with a manually activated locking lever.

In this way, the washing apparatus can be connected without tools to the carriage, since the tongues enter into receiving openings, the washing apparatus is set on the carriage, and then secured by the locking lever handle. All supply and removal lines are again in this operation, automatically coupled.

As washing apparatuses, different types of construction can be used, which, however, must possess the same connection configuration for connection to the carriage, so that they are exchangeable, by choice and substitution, with the carriages.

Among other designs, the possibility exists, that the washing apparatus possesses two, somewhat axis parallel brushes, which are installed in housing areas separate from one another and the application area of each points in different directions for the simultaneous application to two associated printing cylinders.

Additional embodiments of the invention are to be found in the additional subordinate claims.

BRIEF DESCRIPTION OF THE DRAWING(S)

In the following, a preferred embodiment of the invention, with its essential details, is described in greater detail with the aid of the drawings.

DETAILED DESCRIPTION OF THE PREFERRED EMBODIMENT(S)

Figure 3:
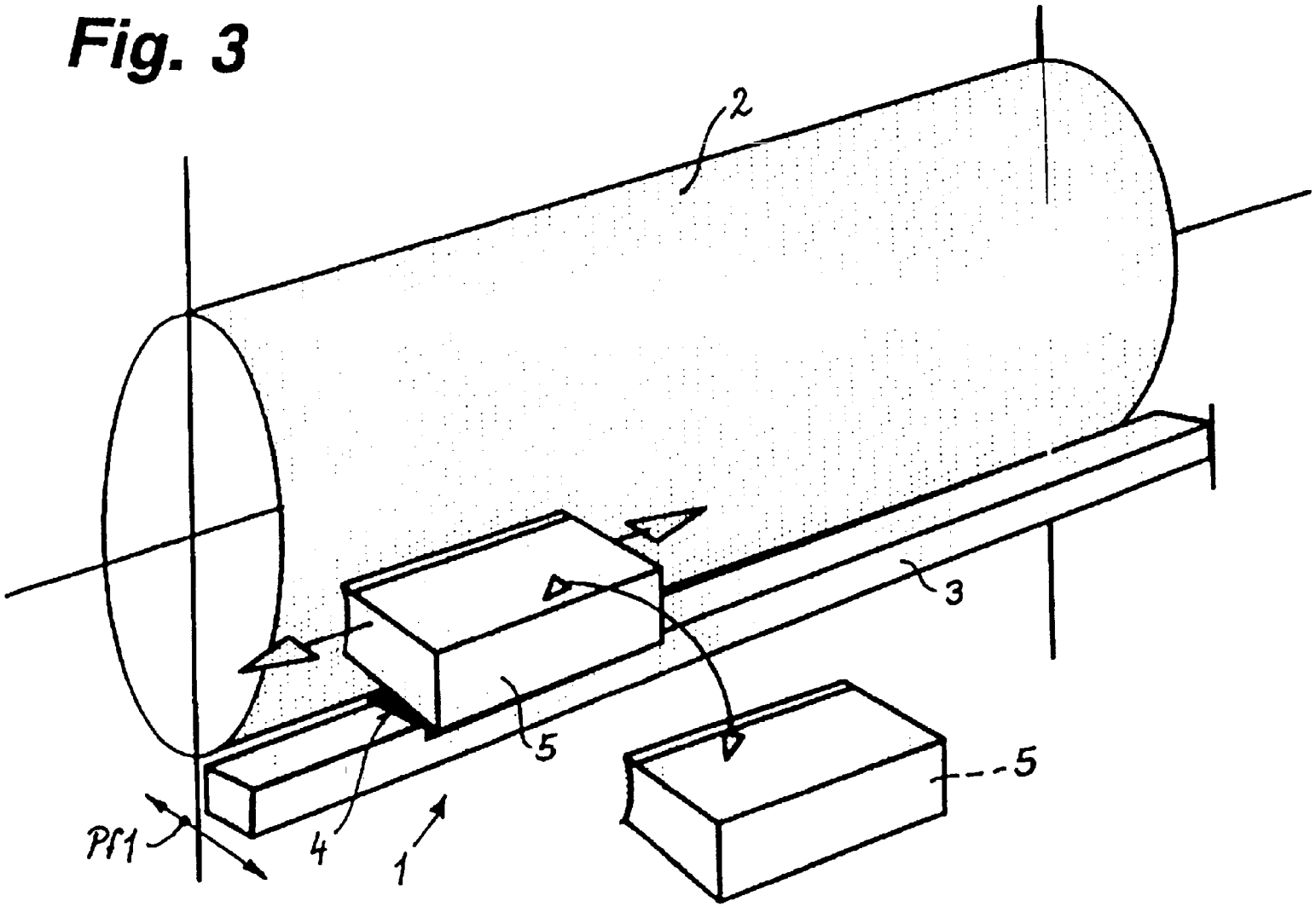
FIG. 3 is a perspective view of the cleaning device for a printing cylinder with a wash apparatus designed as an interchangeable module.

A cleaning apparatus 1 is provided for the cleaning of a printing cylinder 2, on which, as a matter of course in operation, deposits of color and paper particulate accumulate, which, from time to time, must be removed. As is shown schematically in FIG. 3, the cleaning device 1 includes a guide rail 3 which runs essentially parallel to the printing cylinder 2, on which guide rail 3 a longitudinally moveable carriage 4 is placed and can be releasably connected to the washing apparatus 5.

The washing apparatus 5, has, on its side proximal to the printing cylinder 2, one or more rotating brushes 6 (FIGS. 1, 4 and 5), which can be applied to the printing cylinder 2 for the cleaning thereof. For the movement for operational positioning, the guide rail 3 on its outer ends, transverse to its longitudinal extent, is so carried as to be movable between an idle position and an operating position in accord with the double arrow Pf.1 (see FIGS. 2 and 3).

Water and detergent, along with electrical power, are fed from external sources to the carriage 4 which can travel along the guide rail 3. Besides these services also control lines are connected to the carriage, 4, and forwarded to the washing apparatus 5. Spent mixtures of water and detergent are drained away from the washing apparatus 5 through a suction wastewater channel.

In accordance with the invention, the supply and removal lines are led inside the guide rail 3 from the washing apparatus 5 to a laterally placed, stationary connection point 7 which does not join in the longitudinal movement of the washing apparatus 5.

A removal line on the one hand, and a supply line on the other are conducted through two separated chambers.

Figure 1:
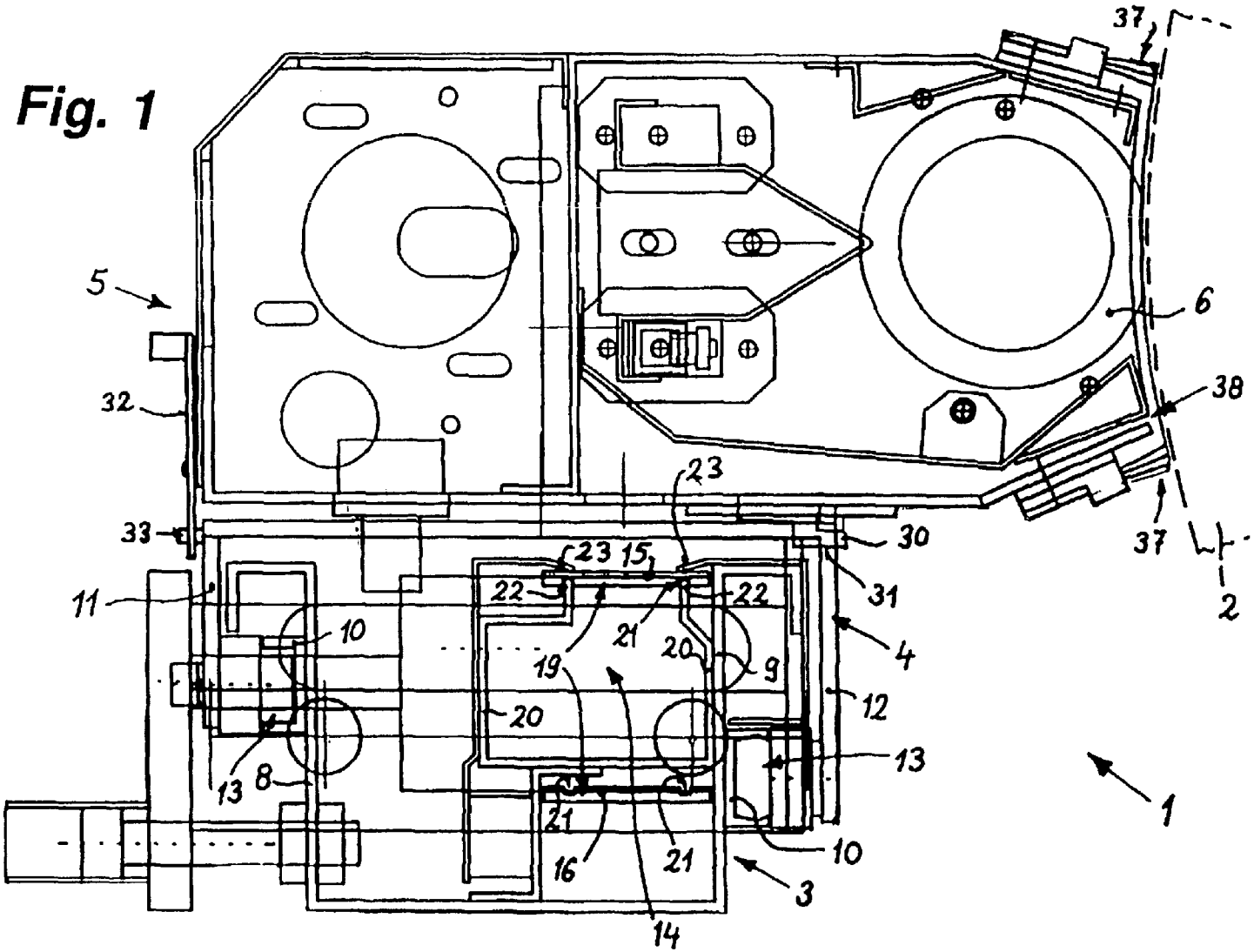
FIG. 1 is a cross-sectional view through a guide rail of a cleaning device with the washing apparatus placed thereon.

As can easily be seen in FIG. 1, the guide rail 3 is shaped like a basin, designed with a somewhat U-shaped cross-section. The guide rail 3 includes on the outside of U-side legs 8 and 9, structural U-bars 10, for the guidance of the carriage 4. This carriage 4 is likewise, U-shaped in its cross-section and overlaps with its side legs 11 and 12 extending downward, the legs of the guide rail 3. The U-side legs 11 and 12, carry on their inside, advantageously, ball bearing sliders 13, which engage in the U-bars 10.

Figure 2:
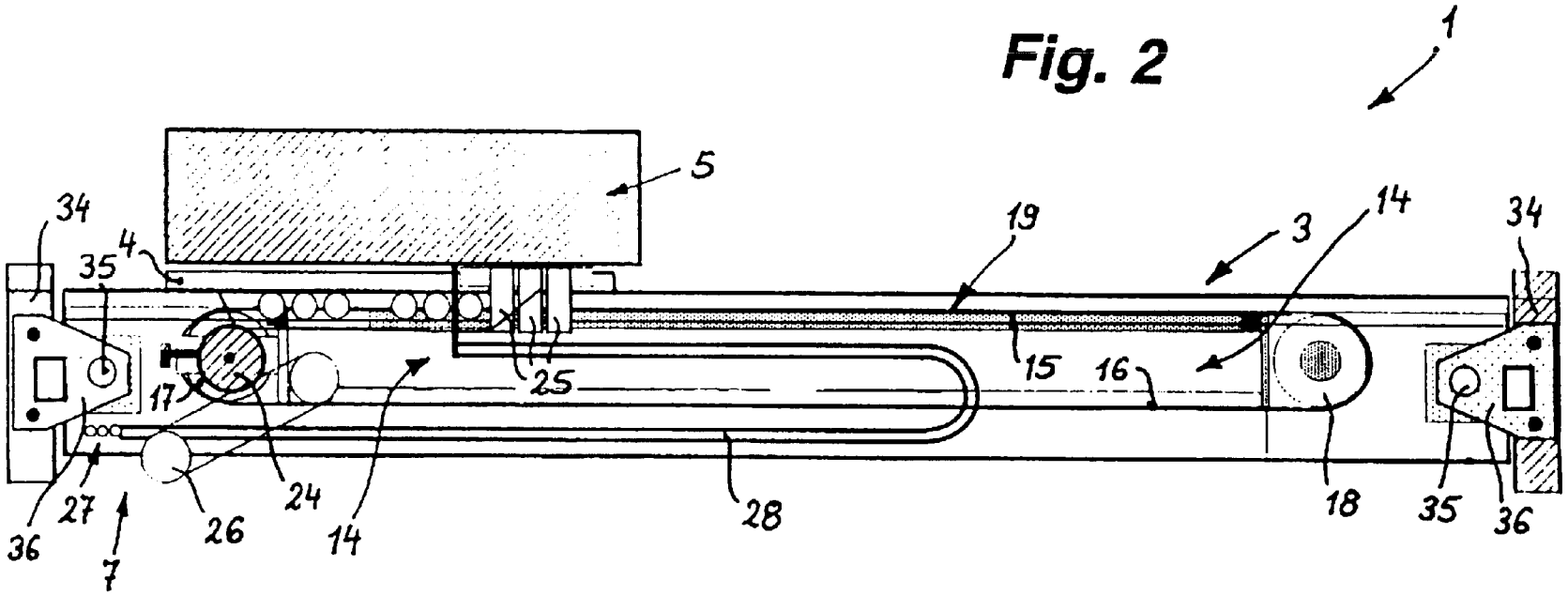
FIG. 2 is a somewhat schematized longitudinal profile view of the cleaning device shown in FIG. 1.

As a removal line for wastewater and detergent, inside of the guide rail 3, a suction wastewater channel 14 is provided. This suction wastewater channel 14 is located between the upper belt section 15 and the under belt section 16, these being sections of a continuous belt 19 reciprocating between turn-around rollers 17, 18 (FIG. 2). This belt 19 serves for the forward and back transport of the carriage 4.

The suction wastewater channel 14 is open on its upper longitudinal side, and, on that side, to a great extent, is sealingly covered by the upper belt section 15.

The lower belt section 16 of the belt 19 runs underneath the suction wastewater channel 14. As is easily seen in FIG. 1, the suction wastewater channel 14 is, essentially, again made in a U-shaped cross section 20, the open longitudinal side of which is covered, as noted, by the upper section 15 of the belt 19. The belt 19 is advantageously fabricated as a toothed belt, and possesses on the inside, respectively in the edge zones, grooves 21 which run peripherally about the said belt. In the area of the upper belt section 15, the said longitudinal edges engage the open sides 22 of the suction wastewater channel, that is, the U-profile 20, in the grooves 21. The belt 19 is thereby side-guided and beyond this, provides at the same time a better sealing closure of the suction wastewater channel 14. On the upper side of the upper belt section 15, there run in addition side members 23. These side members 23 overlap the edges of the belt 19, somewhat up to longitudinal edges 22 of the open top longitudinal side of the suction wastewater channel 14, and form an additional guidance for the belt 19.

The belt 19 is preferably made of plastic. However, belts of rubber or metal may be employed.

As already mentioned, the belt 19 reciprocates by means of turn-around rollers 17, 18 located at far ends outside of the ends of the suction wastewater channel 14. These turnaround rollers 17, 18 are coupled with a drive motor 24. The belt 19, on this account, can be run in either direction. In the disclosed embodiment, a drive motor 24 is axially coupled to the turn-around roller 17. This does not exclude the possibility that the motor can be offset to the side, in which case drive power transmission to the turn-around rollers 17, 18 would be by a chain or another belt.

The carriage 4 is coupled with the belt 19 in order to be able to carry out a forward and back motion along the guide rail 3. For this purpose, the belt can be designed as fixed on one end and with its free end connected to the carriage 4. In the depicted embodiment, the belt 19 is shown designed as an endless belt. In the area of the carriage 4, (FIG. 2) a plurality of connection fittings 25 are furnished which serve as wastewater connectors into the interior of the suction wastewater channel 14. These connection fittings 25 sealingly penetrate the belt 19 and crate thereby, a connection between the interior of the suction wastewater channel 14 and the washing apparatus 5 which is set on the carriage 4. In addition to this, through the penetrative engagement in the belt 19, the fittings 25 also form coupling elements for the drive connection.

Since the belt 19, for the purpose of covering over the suction wastewater channel 14, has a corresponding width of, for example, 3 cm, then also, correspondingly dimensioned connection fittings 25, can be provided with, for example, diameters of 15 mm to some 20 mm, in order to allow an effective drainage. The entire through flow cross-section can be made to match the requirements by means of the number of the connection fittings 25 which are placed beside one another along the belt 19.

In the case of the connection position 7, a connection pipe 26 is attached to the suction wastewater channel 14 for a (not shown) supply unit, which, by means of a hose, is connectable to a source unit which possesses a suction apparatus.

As is to be seen in FIG. 2, the connection position 7 is to be found to the left at the end of the guide rail 3. Besides the connection pipe 26, belonging to this connection point 7, are the following, which are mentioned, but not described in detail, for instance: quick separating plug-in connections 27 for the supply of hot water, detergents, steam, compressed air as well as electrical energy. The supply source which is associated with the connection position 7 possesses an electronic control apparatus, preferably a programmable stored program control, which can have an interface to an overriding control of the printing machine. Beyond that, there is provided respectively, an apparatus for generating hot water, steam, suction, a source of compressed air and a detergent dispensing device.

Within the guide rail 3 are placed supply lines with the operational media provided for the services of the washing apparatus 5. These lines are located beside, or possibly under, the suction wastewater channel 14 in a drag chain 28 (FIG. 2). One end of the drag chain 28 is anchored at the connection point 7, while the other end is attached to the carriage 4 and moves forward and back with the said carriage. For this purpose, the drag chain 28 is installed in a manner resembling a hose.

The carriage 4 and the washing apparatus 5 connected thereto possess on their sides which face one another, electrical plug-in fittings, liquid connections as well as the coupling for wastewater suction. These connections, where required, are provided with the appropriate piping supports and O-ring seals. The couplings are designed as self-coupling, complementary elements, so that, upon the placing of the washing apparatus 5 on the carriage 3, all supply and removal service connections are automatically made.

For the precise placement orientation of the coupling of the carriage 4 and the washing apparatus 5, a positioning pin 29 with a complementarily engaging counter opening (FIG. 5) is provided.

For the mechanical connection of the washing apparatus 5 and the carriage 4, as shown in FIG. 1, hooklike, insertable tongues 30 are furnished on the washing apparatus 5. On the carriage 4 are complementary openings 31 for said tongues.

This connection is to be found on the one longitudinal side of the carriage 4, while on the other longitudinal side, the mechanical connection comprises a manually operated locking lever 32, for which a bolt 33 on the carriage 4 serves as fulcrum.

For the operational movement of the cleaning device 1, the guide rail 3 is so mounted that it is moveable only transversely to its longitudinal extent. For this purpose, on both of the outer ends of the guide rail 3, sliding elements 34 are installed. These sliding elements 34 make it possible for the guide rail 3 to be taken up by holding members, which are installed on both sides of the printing cylinder, and to accomplish the operational movement, the washing apparatus 5 is also moved transversely to bring its brushes 6 into contact with the printing cylinder 2. Serving as a drive for this transverse movement, thrust cylinders with pistons 35, are integrated into the guide rail 3. The cylinders are secured onto the lateral holding members by the plates 36. By programmed, pneumatically controlled action of the pistons 35, these pistons move the guide rail 3, with the superimposed washing apparatus 5 through a specified distance into the washing position and then back again into an idle position.

The washing apparatus 5 possesses at least one rotating brush 6, which is connected to a rotational drive, wherein this drive is either integrated in the brush 6 or the drive power is transmitted by intermediate chain or belt connection to the said brush 6. As is obvious from FIG. 1, the application area of the brush 6 of the washing apparatus 5 is bordered by a flat, brushlike cleaning blade 37. Besides this, one or more suction removal openings 38 for the accumulating wastewater and detergent mixture are provided. Also, in the interior of the washing apparatus 5 are to be found spray nozzles, by means of which the brushes 6 are sprayed with water and detergent. In addition to this, exit nozzles for steam are provided in order to also clean the printing cylinder 2 with this medium.

Figure 5:
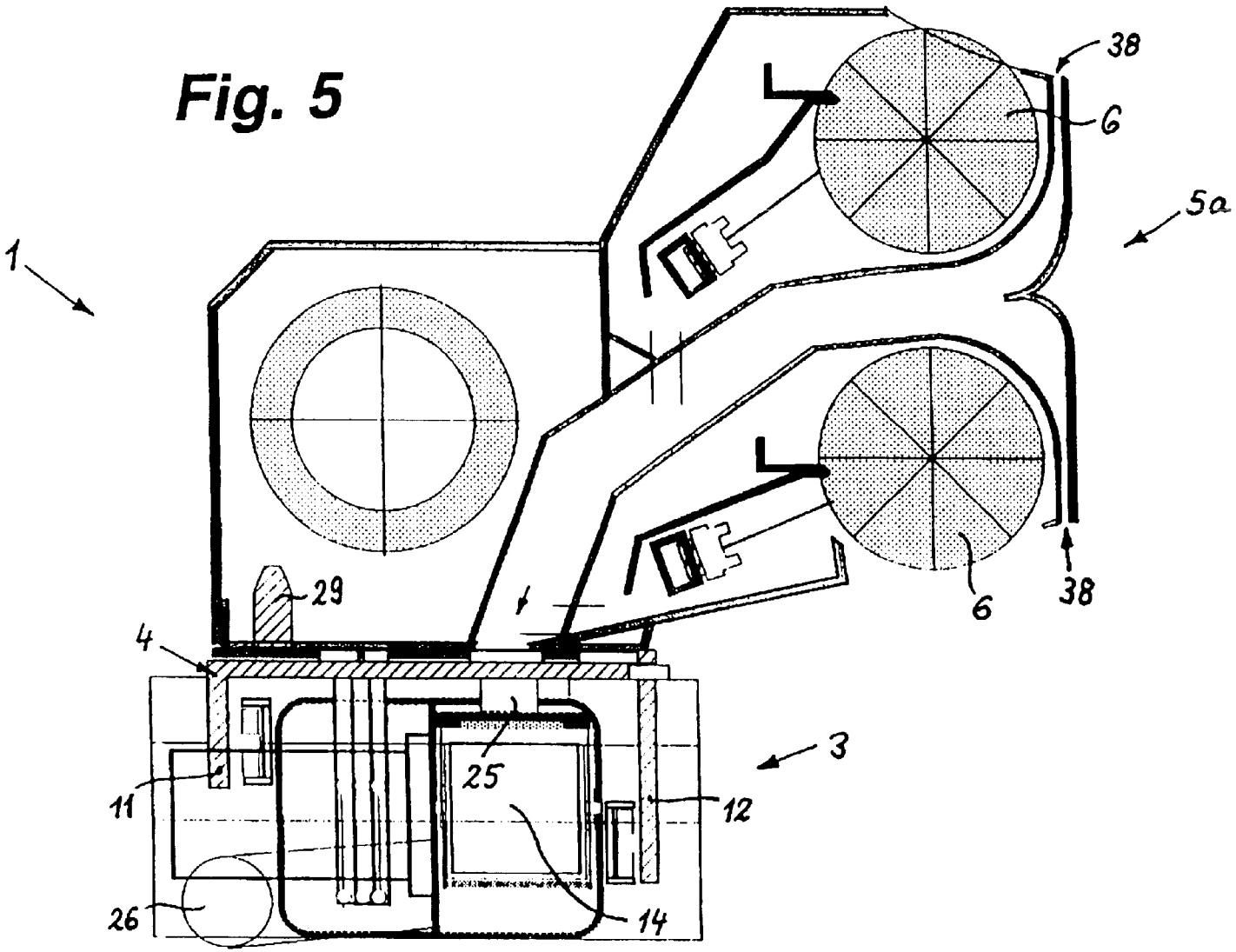
FIG. 5 is a cross-sectional view of a cleaning device with a twin washing apparatus for the simultaneous cleaning of two printing cylinders.

FIG. 5 shows a cleaning apparatus, in which the superimposed washing apparatus 5a is equipped with two, more or less axis parallel brushes, which are installed in housing compartments separated from one another.

It is well to remember, in connection with this, that the cleaning action procedures, are now provided in two directions and cleaning operations are thus performed on two neighboring printing cylinders which are placed next to one another.

Figure 4:
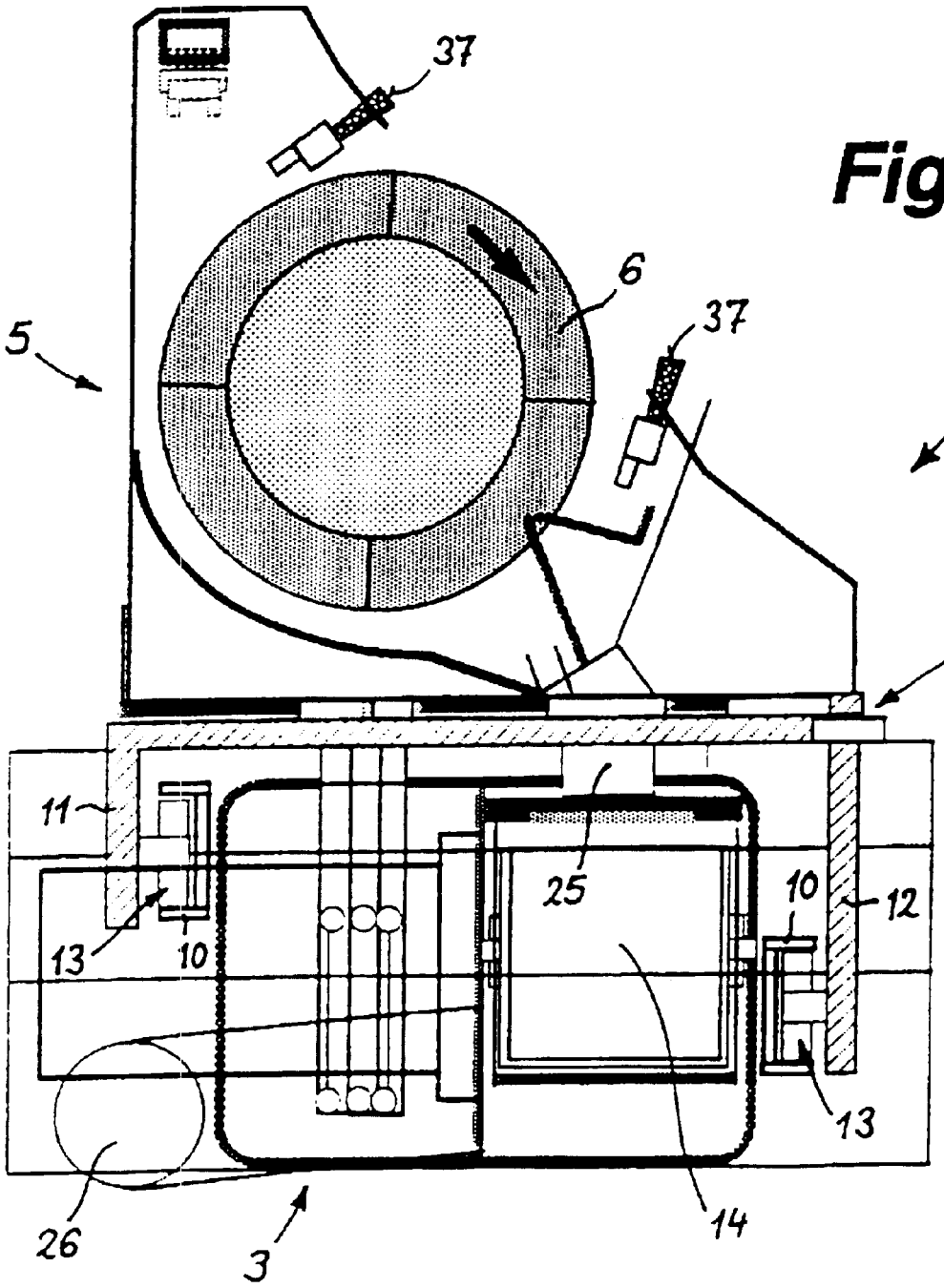
FIG. 4 is a cross-sectional view of a cleaning device with an embodiment of a washing apparatus changed from that of FIG. 1.

In the designs of the washing apparatuses, it is essential, that the connections of the different washing apparatuses 5, 5a, as seen in FIGS. 1, 4 and 5, for connection to a carriage, match identically. This allows the washing apparatuses 5, 5a to be connectable with the guide rail 3 on a choice and exchange basis. Further by these matching connections, the possibility arises of assigning to each of a plurality of printing cylinders, its own guide rail and carriage. Then, a single washing apparatus can be successively connected to the existing guide rails. Thereby, as a whole, an especially cost effective cleaning device for a plurality of printing cylinders can be realized.

What is claimed is:

1. A cleaning device for a printing cylinder (2) of a printing machine, comprising a guide rail (3) placed approximately parallel to the printing cylinder (2), a longitudinally traveling carriage (4) is mounted for movement on the guide rail and a washing apparatus (5) is releasably connected to the carriage, wherein the guide rail (3) is movable for positioning of the washing apparatus (5) against the printing cylinder (2), and the washing apparatus (5) is connected with a source of supply by supply lines for detergent, air, and electrical current, the supply lines extend inside the guide rail (3) from the washing apparatus (5) to a stationary connection point (7), and the guide rail (3) encloses internally a suction wastewater channel (14), which is located between upper and lower sections (15, 16) of a belt (19) which reciprocates between turn-around rollers (17, 18) for transport of the carriage (4), the upper belt section (15) forms an effectively sealing cover for an open longitudinal side of the suction wastewater channel (14), and in an area of the carriage (4), at least one connection fitting (25) to an interior of the suction wastewater channel (14) is provided and in an area of the stationary connection point (7), a connection pipe (26) for connection to the wastewater channel (14) is provided and the remaining supply lines run inside the guide rail (3) from the stationary connection point (7) to the carriage (4).

2. A cleaning device in accordance with claim 1, wherein the stationary connection point (7) for the supply lines leading to the carriage (4) is located at one end of the guide rail (3) and for guiding the supply lines within the guide rail (3), a drag chain (28) is provided.

3. A cleaning device in accordance with claim 1, wherein in an area of the carriage (4), the at least one connection fitting (25) penetrates into the interior of the suction wastewater channel through the belt (19) and engages sealingly in at least one connection opening of the washing apparatus (5) on the carriage (4).

4. A cleaning device in accordance with claim 1, wherein the belt (19) is constructed as an endless belt and a drive connection to the carriage (4) is formed by the at least one connection fitting (25), said at least one connection fitting sealingly penetrating the belt (19).

5. A cleaning device in accordance with claim 1, where the supply lines comprise at least one hot water and detergent hose, an energy feed cable and a control cable.

6. A cleaning device in accordance with claim 1, wherein the carriage (4) and the washing apparatus (5) attachable therewith include on their mutually facing sides, electrical plug-in connections, as well as suction drainage couplings, which are designed as self connecting, self coupling complementary elements and for appropriate positioning for coupling of the carriage (4) and the washing apparatus (5), at least one positioning pin (29) engaging in a complementary opening is furnished.

7. A cleaning device in accordance with claim 1, wherein quick separating plug-in connections are provided for connection to the source of supply.

8. A cleaning device in accordance with claim 1, wherein the source of supply includes at least one electronic control apparatus with an interface to a superimposed control of the printing machine, and an apparatus for generating hot water, steam, suction, compressed air, as well as means for dispensing detergent.

9. A cleaning device in accordance with claim 1, wherein one of the turn-around rollers (17, 18) is coupled with a drive motor (24).

10. A cleaning device in accordance with claim 1, wherein the suction wastewater channel (14) has an essentially U-shaped cross sectional profile (20), the open longitudinal side of which is covered over by a portion (15) of the belt (19); and longitudinal rims of the belt, on a surface distal from the suction wastewater channel (14), are provided with overlapping side bars (23).

11. A cleaning device, in accord with claim 10, wherein the belt (19) is a toothed belt, and on an inside surface, possesses continuous grooves (21) near each edge; and the suction wastewater channel (14), with its edges (22) of its open longitudinal side, respectively sealingly engage in the grooves (21).

12. A cleaning device in accordance with claim 1, wherein the guide rail (3) has a basin shape, and on an outer side of the basin shape, guides are formed by U-shaped structural elements (10) for the carriage (4), said carriage covering the open side of the guide rail (3) and engaging in the U-shaped structural elements (10) with ball bearing supported slides (13).

13. A cleaning device in accordance with claim 1, wherein the guide rail (3) includes an open inner cross section for reception of the suction wastewater channel (14) along with the belt (19) which is associated therewith, and has a longitudinally neighboring space for the supply lines enclosed in a drag chain (28).

14. A cleaning device in accordance with claim 1, wherein the guide rail (3) includes, for forward and back positioning operations, sliding elements (34) for insertion into holding structures located on ends of the guide rail, and thrust cylinders (35) are provided for movement of the guide rail, the cylinders are installed at ends of the guide rail (3) and are coupled to lateral holding means.

15. A cleaning device in accordance with claim 1, wherein for connection of the washing apparatus (5) and the carriage (4), penetrative tongues (30) are installed on the washing apparatus (5) and complementary seatings with plug-in openings (31) are installed on the carriage (4) and, distanced from this connection, a locking connection with a manually activated lever (32) is provided.

16. A cleaning device in accordance with claim 1, wherein the washing apparatus (5) has a length which is smaller than about half the length of the printing cylinder (2).

17. A cleaning device in accordance with claim 1, wherein the washing apparatus (5) includes at least one rotating brush (6), which is connected to a driving mechanism and the driving mechanism is either integrated in the at least one brush (6), or transmits driving power through chain or belt drives to the at least one brush (6).

18. A cleaning device in accordance with claim 17 wherein a cleaning operations area of the at least one brush (6) of the washing apparatus (5) are bordered on both sides by a respective blade cleaner (37), and at least in an underpart of the cleaning operations area one or more suction drainage openings (38) for the accumulating wastewater, detergent mixture are furnished.

19. A cleaning device in accordance with claim 1, wherein the washing apparatus (5a) includes two brushes (6), with approximately parallel axes, installed in two chambers separated from one another, said brushes having active cleaning areas aimed in different directions for simultaneous cleaning of two printing cylinders.

*20. A cleaning device for a printing cylinder (2) of a printing machine, comprising a guide rail (3) placed approximately parallel to the printing cylinder (2), a longitudinally traveling carriage (4) is mounted for movement on the guide rail and a washing apparatus (5) is connected to the carriage, wherein the guide rail (3) is movable for positioning of the washing apparatus (5) against the printing cylinder (2), and the washing apparatus (5) is connected with a source of supply by supply lines for detergent, air, and electrical current, the supply lines extend inside the guide rail (3) from the washing apparatus (5) to a stationary connection point (7), and the guide rail (3) encloses internally a suction wastewater channel (14), which is located between upper and lower sections (15, 16) of a belt (19) which reciprocates between turn-around rollers (17, 18) for transport of the carriage (4), the upper belt section (15) forms an effectively sealing cover for an open longitudinal side of the suction wastewater channel (14), and in an area of the carriage (4), at least one connection fitting (25) to an interior of the suction wastewater channel (14) is provided and in an area of the stationary connection point (7), connection pipe (26) for connection to the wastewater channel (14) is provided and the remaining supply lines run inside the guide rail (3) from the stationary connection point (7) to the carriage (4).*

* * * * *